United States Patent [19]

Bale

[11] 4,416,257
[45] Nov. 22, 1983

[54] SOLAR ENERGY COLLECTOR

[76] Inventor: Neville R. Bale, Cnr Avian & Killick Sts., Maroochydore, Qld., Australia

[21] Appl. No.: 269,038

[22] PCT Filed: Sep. 7, 1980

[86] PCT No.: PCT/AU80/00060
§ 371 Date: May 7, 1981
§ 102(e) Date: May 7, 1981

[87] PCT Pub. No.: WO81/00755
PCT Pub. Date: Mar. 19, 1981

[30] Foreign Application Priority Data

Sep. 7, 1979 [AU] Australia ............................... PE0387

[51] Int. Cl.³ .............................................. F24J 3/02
[52] U.S. Cl. ..................................... 126/427; 126/437; 126/438; 126/439; 126/443; 126/448; 126/434; 165/175
[58] Field of Search ............... 126/437, 434, 438, 448, 126/443, 422, 427, 449; 165/171, 175

[56] References Cited

U.S. PATENT DOCUMENTS

| 2,705,948 | 4/1955 | Rostock | 126/448 X |
| 4,037,785 | 7/1977 | Madern | 126/427 |
| 4,081,966 | 4/1978 | de Geus | 126/438 X |
| 4,086,911 | 5/1978 | Futch | 126/437 X |
| 4,227,511 | 10/1980 | Margen et al. | 126/448 X |
| 4,249,520 | 2/1981 | Orillion | 126/448 X |
| 4,287,879 | 9/1981 | Roark | 126/437 |

FOREIGN PATENT DOCUMENTS 2280036 3/1976 France ............................... 126/438

Primary Examiner—Samuel Scott
Assistant Examiner—Randall L. Green
Attorney, Agent, or Firm—McAulay, Fields, Fisher, Goldstein & Nissen

[57] ABSTRACT

A solar energy collector comprising a collector core located within a longitudinal parabolic reflector and formed of a series of spaced tubes exposed to the direct rays of the sun and to rays reflected by the reflector and arranged in a cylindrical array extending longitudinally to form a fluid path between two end annular manifolds connected at opposite ends of a storage tank located within the array.

10 Claims, 8 Drawing Figures

SOLAR ENERGY COLLECTOR

FIELD OF THE INVENTION

This invention relates to improvements in solar energy collectors.

Existing collectors used for example as water heaters are large and cumbersome but the collector of this invention has a unique core configuration and construction which make it extremely efficient and compact.

SUMMARY OF THE INVENTION

In one form the collector of this invention comprises a longitudinal reflector, a collector core within said reflector, a storage tank connected in series to said core, a cold water inlet and a hot water outlet, said core containing a series of tubes which are exposed to the sun's direct and reflected rays and through which water circulates.

BRIEF DESCRIPTION OF THE DRAWING

The following is a description of a preferred embodiment of the invention in the form of a water heater, with reference to the accompanying drawings in which.

DISCLOSURE OF BEST MODE OF INVENTION

Figure 3:
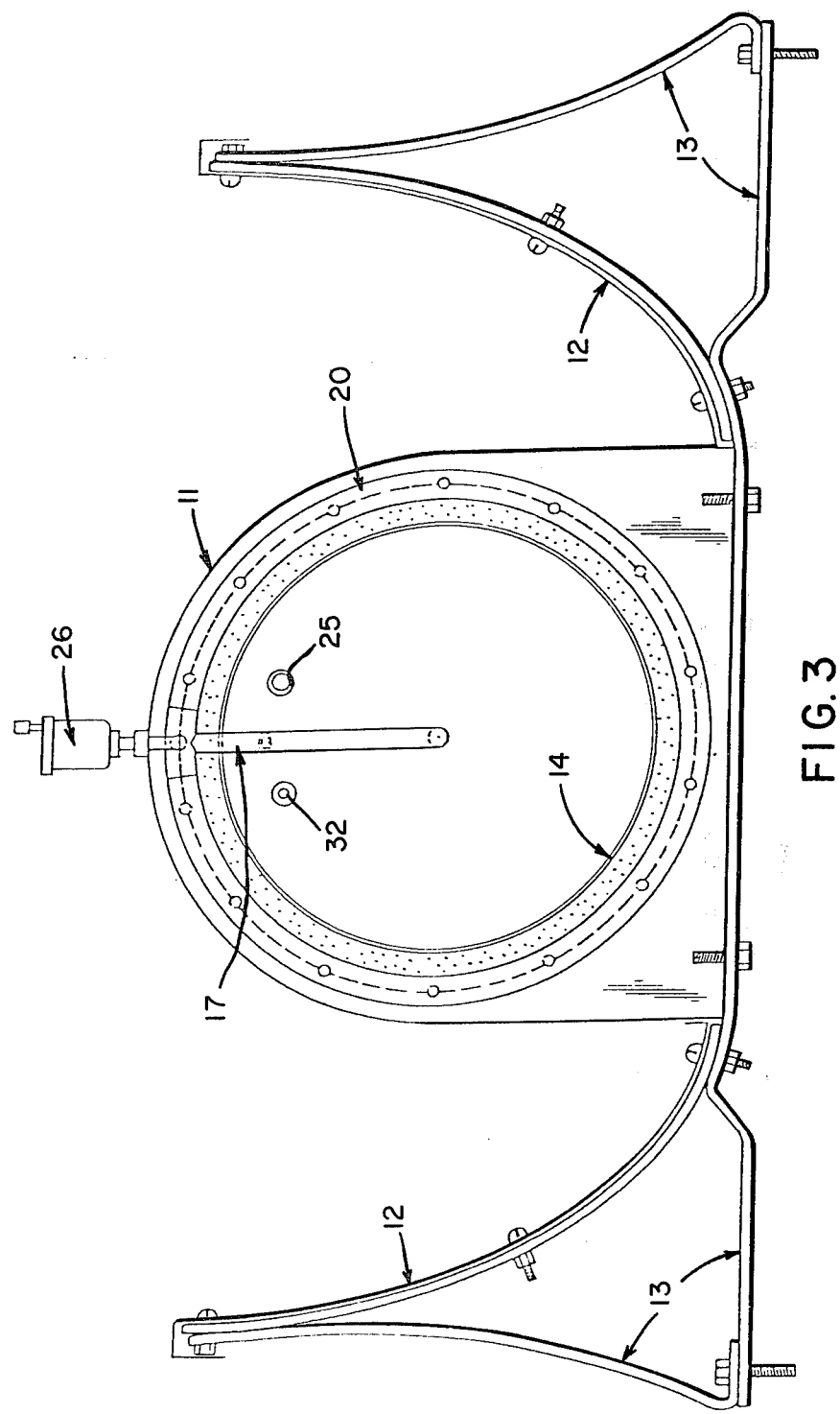
FIG. 3 is an end view of the heater with the core and end cap removed.
Figure 6:
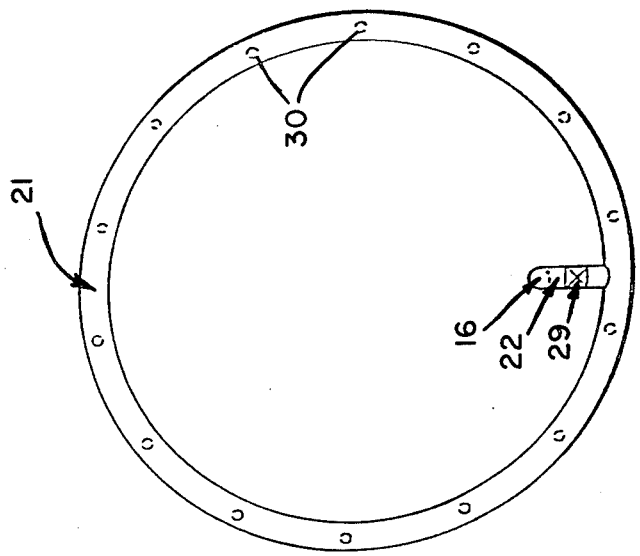
FIG. 6 is an end view of the inlet manifold.
Figure 5:
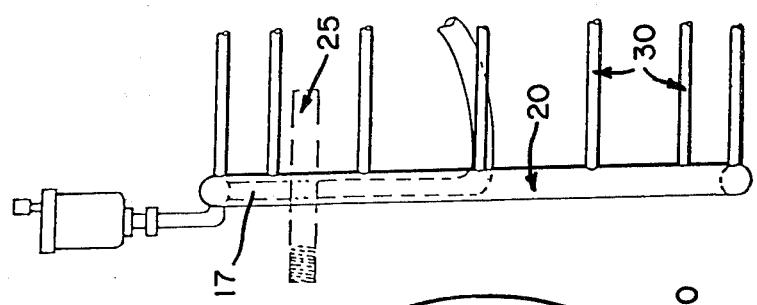
FIG. 5 is a side view corresponding to FIG. 4.
Figure 4:
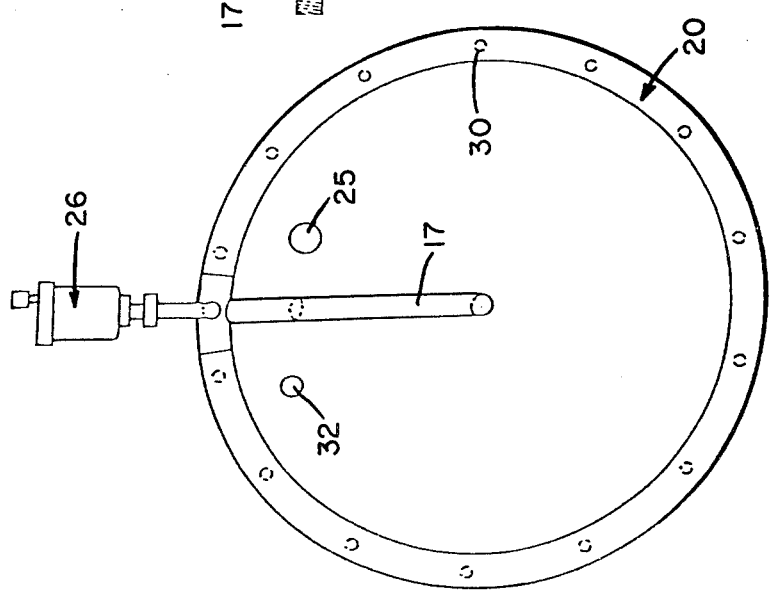
FIG. 4 is an end view of the outlet manifold.

The collector core 10 is housed within a clear cover 11 made of a polycarbonate plastic so as to protect the core and prevent heat loss by re-emittance. The cover also protects the unit from projectiles and forms a shield against the weather so as to prevent premature deterioration of the core. Parabolic reflectors 12 are supported on either side of the core 10 so as to direct the sun's rays onto the core 10. The curved reflectors 12 are made from highly polished stainless steel and are designed to reflect the sun's rays from almost any angle. Each reflector 12 is provided with spaced angle support brackets 13 (FIG. 3) along the outer portion so as to form a suitable base for mounting the unit on an exposed surface such as a roof at an incline of not less than 15° to the horizontal and aligned on a north-south azimuth. The cylindrical core assembly 10 houses a storage tank 14 which is supported in rigid urethane foam insulation to prevent heat loss from the storage tank 14 to the outer core. The tank 14 has end caps 15 one of which has a cold water inlet 16 and the other of which has a hot water outlet 25.

Figure 7:
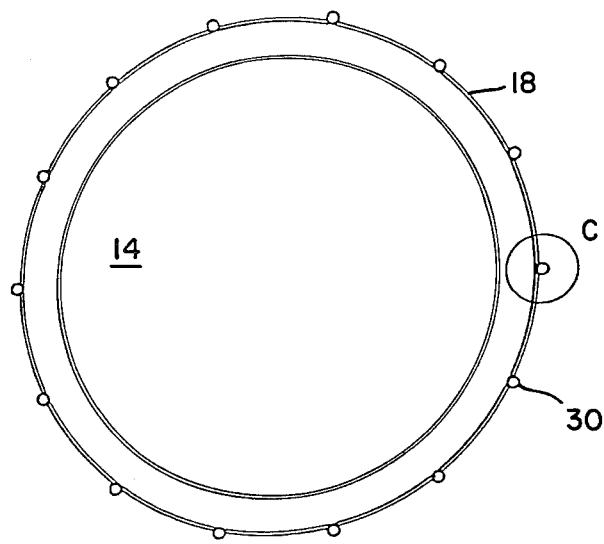
FIG. 7 is a section through AA of FIG. 2.
Figure 8:
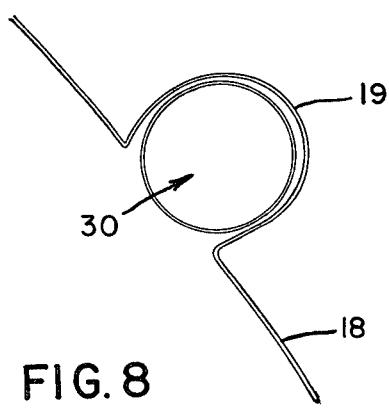
FIG. 8 is a view of the detail C of FIG. 7.

As shown in FIGS. 7 to 8 the core assembly 10 is formed from a cylindrical copper sheet 18 indented longitudinally along the inner face of the cylinder. The tubes 30 connect at opposite ends to respective annular manifolds 20 and 21 as shown. The lower manifold 21 adjacent the cold water inlet 16 is provided with an upstanding pipe 22 at lowermost portion which intersects the cold water inlet 16 while the uppermost manifold 20 is provided with an outlet 17 (FIG. 3) leading back into the tank. A pressure and temperature relief valve 32 provides for the dumping of water when the temperature or the pressure rises above a predetermined level.

Figure 1:
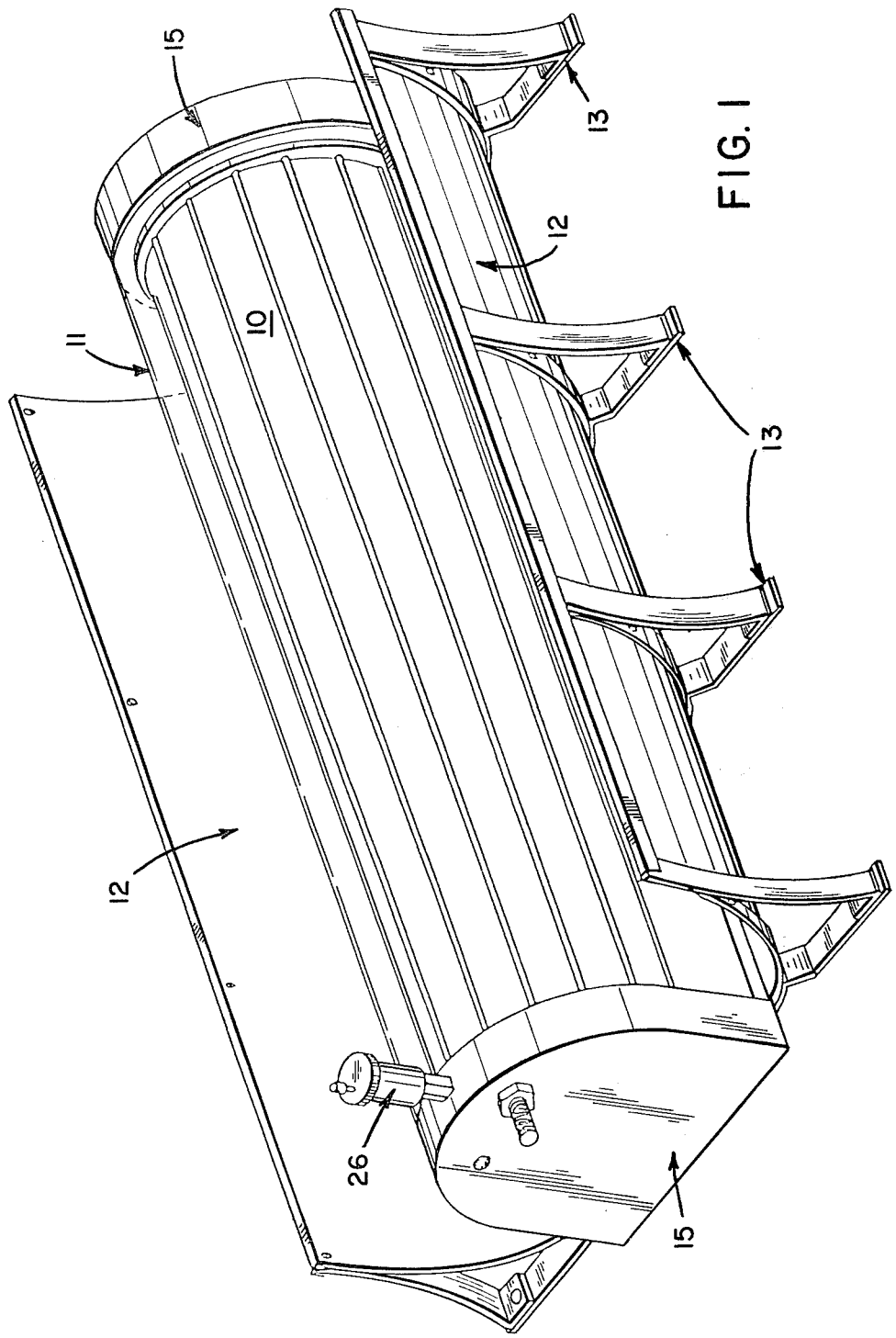
FIG. 1 is a perspective view of the assembled heater.
Figure 2:
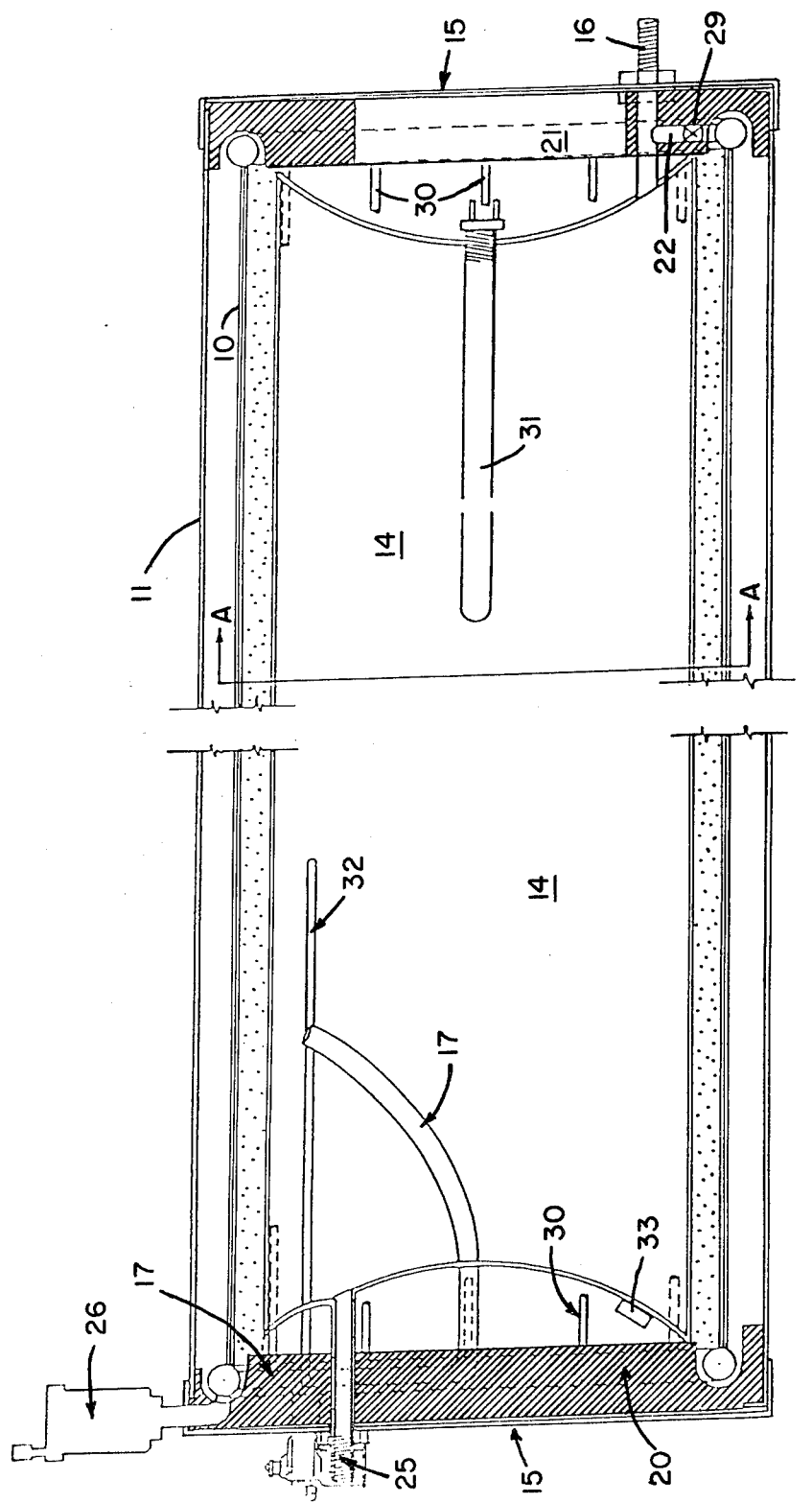
FIG. 2 is a mid sectional view of FIG. 1.

In use, throughout the day, heat is absorbed by the core assembly 10 both by direct radiation from the sun and by reflection from one or both of the reflectors 12. This heat is transferred into the water in the tubes 30 and the thermosyphon effect causes the fluid in the storage tank and in the core assembly to circulate so that water is heated as it passes from the inlet manifold 21 to the outlet manifold 20 and into the storage tank 14. A non-return valve 29 (FIG. 2) is located in the pipe 22 to prevent reverse circulation due to the temperature of the core assembly dropping below that of the water contained in the storage tank 14. A bleeder flamvent valve 26 of the type known as "Flamvent" provides an escape for air trapped in those areas which would normally prevent the thermosyphon action.

In use, the storage tank is always filled to capacity, being permanently connected to an outside water supply having a static head pressure of at least two meters. As hot water is drawn from the storage tank, cold water from the pressurised outside water supply enters both the tank and the inlet manifold and the thermosyphon effect circulates water through the core to be reheated.

It is possible to modify the above apparatus in a number of ways. The storage tank need not be housed in the core assembly. It could be located in any of the places utilised by conventional heating systems. It is also possible to boost the temperature of the system during periods of inadequate sunlight by conventional means such as the electrical immersion element (shown at 31 in FIG. 2).

Further a pump may be connected between the tank and the collector core to circulate water from the tank through the collector tubes at a rate of circulation greater than that due to the thermosyphon. This has the effect of minimising any re-emittance of heat from the high temperature collector tubes. The most effective way of achieving this is by means of an electric pump 33 (FIG. 2) powered by photo-voltaic cells, the energy output of which is in direct proportion to the intensity of sunlight. Accordingly the pump is most active when the temperature of the tubes is highest, and there is no need for temperature sensors and switches adapted to activate the pump in accordance with preselected temperature changes.

These and other modifications are possible without departing from the basic inventive concept.

I claim:
1. A solar collector, comprising:
   a longitudinal parabolic reflector;
   a collector core assembly within said reflector and formed of a series of spaced tubes exposed to the direct rays of the sun and to rays reflected by said reflector;
   said tubes being arranged in a cylindrical array and forming a fluid path between annular inlet and outlet manifolds;
   a storage tank located within said array; and
   means for connecting said manifolds to opposite ends of said tank whereby said fluid is heated as it passes in said tubes from said inlet manifold to said outlet manifold to said tank.
2. The collector of claim 1, wherein said tubes are mounted in thermally conductive cylinders.
3. The collector of claim 1, wherein said tank includes end caps; one of said caps having a cold water inlet and the other to a hot water outlet said inlet being perma- nently connected to a water supply having a static head pressure of at least two meters whereby said tank is always filled to capacity.

4. The collector of claim 3, wherein an upstanding pipe connects said inlet manifold with a non-return valve in said pipe to prevent reverse circulation of fluid when the temperature of said core assembly drops below that of the fluid in said tank.

5. The collector of claim 1, further including insulating means between said tank and said array.

6. The collector of claim 1 further including a transparent cover enclosing said array of tubes.

7. The collector of claim 1, wherein said reflector comprises two curved surfaces mounted on either side of said array.

8. A solar collector comprising in combination, a longitudinal parabolic reflector;
   a collector core assembly within said reflector and formed of a series of spaced tubes exposed to the direct rays of the sun and to rays reflected by said reflector;
   said tubes being arranged in a cylindrical array between annular inlet and outlet manifolds;
   a storage tank located within said array;
   means for connecting said manifolds to opposite ends of said tank;
   said tank receiving fluid circulating in said tubes; and
   electrical heating means immersed in said tank for boosting the temperature of fluid therein during periods of inadequate sunlight.

9. A solar collector comprising, in combination, a longitudinal parabolic reflector;
   a collector core assembly within said reflector and formed of a series of spaced tubes exposed to the direct rays of the sun and to rays reflected by said reflector;
   said tubes being arranged in a cylindrical array between annular inlet and outlet manifolds;
   a storage tank located within said array;
   means for connecting said manifolds to opposite ends of said tank;
   said tank receiving fluid circulating in said tubes; and
   a pump connected between said tank and said collector core to circulate fluid from said tank through said tubes at a rate of circulation greater than that due to the thermosyphon effect in said tank.

10. The combination of claim 9 wherein said pump is powered by photovoltaic cells.

* * * * *